United States Patent
Wicker et al.

(10) Patent No.: US 7,371,795 B2
(45) Date of Patent: May 13, 2008

(54) POLYMER MIXTURE AND THE UTILIZATION THEREOF FOR INJECTION MOLDED PARTS

(75) Inventors: Michael Wicker, Seeheim-Jugenheim (DE); Klaus Schultes, Wiesbaden (DE); Klaus Albrecht, Mainz (DE); Werner Hoess, Shanghai (CN); Mona Rueppel, Hoechst (DE); Eric Reinheimer, Gross-Zimmern (DE); Wolfgang Fuchs, Alsbach-Haehnlein (DE); Tony Halblaender, Griesheim (DE)

(73) Assignee: Roehm GmbH & Co. KG, Darmstadt (DE)

( * ) Notice: Subject to any disclaimer, the term of this patent is extended or adjusted under 35 U.S.C. 154(b) by 0 days.

(21) Appl. No.: 10/575,477

(22) PCT Filed: Sep. 1, 2004

(86) PCT No.: PCT/EP2004/009704

§ 371 (c)(1),
(2), (4) Date: Apr. 12, 2006

(87) PCT Pub. No.: WO2005/047392

PCT Pub. Date: May 26, 2005

(65) Prior Publication Data

US 2007/0112135 A1    May 17, 2007

(30) Foreign Application Priority Data

Oct. 17, 2003   (DE)  ............... 103 49 142

(51) Int. Cl.
C08L 33/00       (2006.01)
C08L 33/08       (2006.01)
C08K 5/00        (2006.01)

(52) U.S. Cl. ............ 524/523; 524/524; 524/515; 525/163

(58) Field of Classification Search ......... 524/523, 524/524, 515; 525/163
See application file for complete search history.

(56) References Cited

U.S. PATENT DOCUMENTS 3,220,916 A * 11/1965 Petropoulos ............ 428/339
3,793,402 A    2/1974 Owens et al.
4,513,118 A *  4/1985 Suetterlin et al. ......... 525/81
4,895,898 A *  1/1990 Kress et al. .............. 525/67
6,020,416 A *  2/2000 Mazur et al. ............. 524/501
6,218,467 B1   4/2001 Wicker et al.
2001/0007890 A1* 7/2001 NieSsner et al. .......... 524/736
2002/0099135 A1* 7/2002 Suzuki .................... 525/64
2005/0080188 A1  4/2005 Schultes et al.
2005/0124761 A1  6/2005 Schultes et al.
2006/0052515 A1  3/2006 Schultes et al.

FOREIGN PATENT DOCUMENTS

| DE | 199 27 769 | 12/2000 |
| EP | 0 113 924  | 7/1984  |
| EP | 0 465 049  | 1/1992  |
| EP | 0 522 351  | 1/1993  |
| EP | 0 683 028  | 11/1995 |
| FR | 2 831 546  | 5/2003  |
| JP | 60-147417  | 8/1985  |

OTHER PUBLICATIONS

U.S. Appl. No. 10/575,477, filed Apr. 12, 2006, Wicker et al.
U.S. Appl. No. 10/575,929, filed Apr. 14, 2006, Schultes et al.
U.S. Appl. No. 10/539,509, filed Dec. 7, 2005, Schultes et al.
U.S. Appl. No. 10/577,954, filed May 2, 2006, Schultes et al.

* cited by examiner

*Primary Examiner*—Vasu Jagannathan
*Assistant Examiner*—Karuna Reddy
(74) *Attorney, Agent, or Firm*—Oblon, Spivak, McClelland, Maier & Neusatdt, P.C.

(57) ABSTRACT

The invention relates to a polymer mixture based on the (meth)acrylate (co)polymer components a), b), c), and/or d) according to claim 1, where a test specimen produced from the polymer mixture simultaneously has the following properties:

I. a tensile modulus (ISO 527) of at least 2600 MPa,
II. a Vicat softening point VSP (ISO 306-B50) of at least 109° C.,
III. an impact strength (ISO 179-2D, flatwise) of at least 17 kJ/m$^2$, and
IV. a melt index MVR (ISO 1133, 230° C./3.8 kg) of at least 1.5 cm$^3$/10 min.

The invention further relates to injection mouldings and to the use of the polymer mixture for producing injection-moulded parts.

8 Claims, No Drawings

POLYMER MIXTURE AND THE UTILIZATION THEREOF FOR INJECTION MOLDED PARTS

The invention relates to a polymer mixture and its use for injection-moulded parts.

PRIOR ART

As a result of the requirement for increasingly low levels of fuel consumption, the automotive industry is attempting to make ever further reductions in the deadweight of motor vehicles. Whereas in the past the exterior of a motor vehicle was very substantially composed of steel parts, economic reasons make it desirable to produce these elements from materials of lower density, while at the same time reducing manufacturing costs.

The property profile of these mouldings is determined by low dead weight together with high weathering resistance, high stiffness, good impact strength, good dimensional stability, in particular also on heating to the region of the continuous service temperature, good chemicals resistance, e.g. with respect to cleaning compositions, good scratch resistance and high gloss.

When steel plate is used, alongside its dead weight shortcoming there is the further disadvantage that the mouldings have to be subjected to painting after manufacture in order to achieve a "Class A surface". Plastics components are therefore increasingly replacing the steel components with the aim of weight reduction, while at the same time reflecting the desire of automotive designers for greater design freedom in terms of component geometry.

Various thermoplastics have hitherto been used in this sector, examples being PC, ASA, ASA/PC, PMMA and glass fibre-filler polymers, e.g. GF polyamide.

Because the mouldings are generally produced by means of injection-moulding processes, another requirement relevant to component geometry (long flow paths with small layer thicknesses) when thermoplastics are used is good flowability of the plastics melt, with the aim of avoiding rejection of parts. To give the automotive producer a substantially free choice of colour, the plastic should moreover have almost no intrinsic colour and at the same time have high light transmittance.

Although the use of glass fibre-reinforced plastics gives mouldings with good mechanical properties, subsequent painting is required here, as with steel, to achieve uniform glossy Class A surface quality.

Polycarbonate has not only high heat resistance but also very good toughness. However, here again surface painting is required because weathering resistance is insufficient, resulting in yellowing, and surface hardness is low. In addition, the inadequate stiffness of this material is problematic for the application mentioned.

Weathering resistance of thermoplastics such as ASA, PMMA and blends of ASA with PC is better than that of polycarbonate. However, in the case of ASA and ASA/PC the stiffness of the material is insufficient to meet the requirements placed upon the components mentioned, as is the surface hardness, which results in inadequate scratch resistance.

PMMA is a material which has excellent weathering resistance and optical quality together with high stiffness, high surface hardness, good heat resistance and good melt flow performance. However, the toughness of PMMA is too low for the application mentioned. To compensate for this shortcoming, PMMA may be optimized via blending with impact modifiers known from the prior art. However, this modification reduces heat resistance and surface hardness to the extent that impact-modified PMMA again fails to meet the requirements.

A wide variety of commercially available moulding compositions based on polymethyl methacrylate is known, and these materials have good properties.

OBJECT AND ACHIEVEMENT

Many commercially available moulding compositions based on polymethyl methacrylate have highly satisfactory materials properties, but have the disadvantage that the individual requirements within the property profile demanded for the production of high-quality injection-moulded parts, e.g. for exterior parts of automobiles, are not achieved consistently (see Comparative Examples 4-9). This has hitherto greatly restricted the possibilities for use of such parts.

The object of the present invention therefore consisted in the provision of a thermoplastic material which has a balanced property profile and which does not have the disadvantages indicated above.

The object is achieved by way of a polymer mixture which comprises the following components
   a) a low-molecular-weight (meth)acrylate (co)polymer
   characterized by a solution viscosity in chloroform at 25° C. (ISO 1628—Part 6) smaller than or equal to 55 ml/g
   b) an impact modifier based on crosslinked poly(meth)acrylates
   c) a relatively high-molecular-weight (meth)—acrylate (co) polymer,
   characterized by a solution viscosity in chloroform at 25° C. (ISO 1628—Part 6) greater than or equal to 65 ml/g and/or
   d) a (meth)acrylate (co)polymer other than a)
   characterized by a solution viscosity in chloroform at 25° C. (ISO 1628—Part 6) of from 50 to 55 ml/g
   where each of the individual components a), b), c) and/or d) may be individual polymers or else a mixture of polymers,
   where the entirety of a), b), c) and/or d) is 100% by weight,
   and where the polymer mixture may also comprise conventional additives, auxiliaries and/or fillers and
   where a test specimen produced from the polymer mixture simultaneously has the following properties:
   I. a tensile modulus (ISO 527) of at least 2600 MPa,
   II. a Vicat softening point VSP (ISO 306-B50) of at least 109° C.,
   III. an impact strength (ISO 179-2D, flatwise) of at least 17 kJ/m$^2$, and
   IV. a melt index MVR (ISO 1133, 230° C./3.8 kg) of at least 1.5 cm$^3$/10 min.

DESCRIPTION OF THE INVENTION

The Polymer Mixture

The invention provides a polymer mixture which comprises the components a), b) and c) and/or d). The polymer mixture may therefore be composed either of the components a), b) and c) or of the components a), b) and d), or of all four of the components. Each of the components a), b), c) and/or d) may be present in the form of an individual polymer or else in the form of a mixture of two or more polymers complying with the appropriate definition.

Properties of the Polymer Mixture

The constituent amounts of the components a), b) and c) and/or d), and their composition, are selected in such a way that a test specimen produced from the polymer mixture simultaneously has the following properties:
I. a tensile modulus (ISO 527) of at least 2600 MPa, preferably at least 2750 MPa, particularly preferably at least 2850 or 3000 MPa,
II. a Vicat softening point VSP (ISO 306-B50) of at least 109° C., preferably at least 110° C., in particular at least 112° C., e.g. from 110 to 125° C.,
III. an impact strength (ISO 179-2D, flatwise) of at least 17 kJ/m$^2$, preferably at least 18, 20, 25 or 30 kJ/m$^2$, and
IV. a melt index MVR (ISO 1133, 230° C./3.8 kg) of at least 1.5 cm$^3$/10 min, preferably at least 1.65, 2.0, or 3.0 cm$^3$/10 min.

Conventional additives, auxiliaries and/or fillers are to be selected in such a way as to give no, or at most very slight, impairment of the property profile mentioned above.

Other Properties

In addition, the constituent amounts of the components a), b) and c) and/or d), and their composition, can be selected in such a way that a test specimen produced from the polymer mixture also has at least some of the following properties:

Intrinsic Colour
  Light transmittance $T_{D65}$ to DIN 5033/7 of at least 50%, preferably at least 55%.

Yellowness Index
  The yellowness index can be determined to DIN 6167 (illuminant D65, 10° on 3 mm layer thickness) and is to be less than 20, preferably less than 17.

Chemicals Resistance
  Fracture time on wetting of the surface with isopropanol with constant outer fibre strain of
    0.39%: >1800 s
    0.50%: >700 s
  Fracture time on wetting of the surface with ethanol/water mixture in a ratio of 70:30 at constant outer fibre strain of
    0.39%: >1800 s
    0.50%: >200 s Surface Harness
  Taber scratch hardness with applied force of
    0.7 N: no surface damage detectable
    1.5 N: <2.0 µm, preferably <1.6 µm
    3.0 N: <6 µm, preferably <5 µm Surface Gloss
  R (60°): >48%, preferably >50%

Quantitative Proportions of the Components

The quantitative proportions in which the components are present are as follows, giving a total of 100% by weight.
Component a): from 25 to 75% by weight, preferably from 40 to 60% by weight, in particular from 45 to 55% by weight.
Component b): from 10 to 60% by weight, preferably from 10 to 20% by weight.
Component c) and/or d): from 10 to 50% by weight, preferably from 12 to 40% by weight.

Test specimens with very high VSP values in the range from 116 to 120° C. can be obtained if c) is present at from 30 to 45% by weight, preferably from 35 to 40% by weight and d) is preferably absent (see Example 3).

Test specimens with high VSP values, in the range from 114 to 118° C. together with high gloss, R(60°)= from 48 to 50 can be obtained if both c) and d) are present, the constituent proportions preferably being from 10 to 15% by weight of c) and from 15 to 25% by weight of d) (see Example 2).

Test specimens with VSP values in the range from 109 to 113° C. together with a very low level of intrinsic colour, and light transmittance $T_{D65}$ to DIN 5033/7 in the range from 60 to 65% can be obtained if d) is present at from 30 to 40% by weight, preferably from 33 to 38% by weight and c) is preferably absent (see Example 1).

The polymer mixture can also comprise conventional additives, auxiliaries and/or fillers.

Preparation of the Polymer Mixture

The polymer mixture may be prepared via dry blending of the components, which may be in pulverulent, granular or preferably pellet form.

The polymer mixture may also be processed via melting and mixing of the individual components in the molten state or via melting of dry premixes of the individual components to give a ready-to-use moulding composition. By way of example, this may take place in single- or twin-screw extruders. The resultant extrudate may then be pelletized. Conventional additives, auxiliaries and/or fillers may be directly admixed or subsequently added by the ultimate user as required.

Component a)
Component a) is a low-molecular-weight (meth)acrylate (co)polymer, characterized by a solution viscosity in chloroform at 25° C. (ISO 1628—Part 6) smaller than or equal to 55 ml/g, preferably smaller than or equal to 50 ml/g, in particular from 45 to 55 ml/g.

This can correspond to a molar mass $M_w$ (weight-average) of 95 000 g/mol ($M_w$ being determined by means of gel permeation chromatography with reference to polymethyl methacrylate as calibration standard). By way of example, the molar mass $M_w$ may be determined by gel permeation chromatography or by a light scattering method (see, for example, B. H. F. Mark et al., Encyclopedia of Polymer Science and Engineering, 2nd Edition, Vol. 10, pp. 1 et seq., J. Wiley, 1989).

Component a) is preferably a copolymer of methyl methacrylate, styrene and maleic anhydride.

By way of example, suitable constituent proportions can be:
  from 50 to 90% by weight, preferably from 70 to 80% by weight, of methyl methacrylate,
  from 10 to 20% by weight, preferably from 12 to 18% by weight, of styrene and
  from 5 to 15% by weight, preferably from 8 to 12% by weight, of maleic anhydride.

Corresponding copolymers may be obtained in a manner known per se via free-radical polymerization. By way of example, EP-A 264 590 describes a process for preparing a moulding composition from a monomer mixture of methyl methacrylate, vinylaromatic compound and maleic anhydride, and also, where appropriate, from a lower alkyl acrylate, where the polymerization is carried out to 50% conversion in the presence or absence of a non-polymerizable organic solvent and where, beyond at least 50% conversion, the polymerization is continued in the temperature range from 75 to 150° C. in the presence of an organic solvent to at least 80% conversion, and then the low-molecular-weight volatile constituents are evaporated.

JP-A 60-147 417 describes a process for preparing a highly heat-resistant polymethacrylate moulding composition, where a monomer mixture of methyl methacrylate, maleic anhydride and at least one vinyl aromatic compound are fed into, and polymerized in, a polymerization reactor suitable for solution or bulk polymerization at a temperature of from 100 to 180° C. DE-A 44 40 219 describes another preparation process.

By way of example, component a) may be prepared by treating a monomer mixture of, by way of example, 6355 g of methyl methacrylate, 1271 g of styrene and 847 g of maleic anhydride with 1.9 g of tert-butyl perneodecanoate and 0.85 g of tert-butyl 3,5,5-trimethylperoxyhexanoate as polymerization initiator and 19.6 g of 2-mercaptoethanol as molecular weight regulator, and also with 4.3 g of palmitic acid. The resultant mixture may be charged to a polymerization cell and devolatilized for 10 minutes, for example. The material may then be polymerized in a water bath, for example for 6 hours at 60° C., and then 30 hours at 55° C. water bath temperature. After about 30 hours, the polymerization mixture reaches its maximum temperature, about 126° C. Once the polymerization cell has been removed from the water bath, the polymer is also heat-conditioned as appropriate for component a) in the polymerization cell for about 7 hours, for example at 117° C. in a hot-air cabinet.

Component b)

Component b) is an impact modifier based on crosslinked poly(meth)acrylates. Component b) preferably has a two-or three-shell structure.

Impact modifiers for polymethacrylates are well known. By way of example, EP-A 0 113 924, EP-A 0 522 351, EP-A 0 465 049, EP-A 0 683 028 and U.S. Pat. No. 3,793,402 describe the preparation and structure of impact-modified polymethacrylate moulding compositions. By way of example, a suitable commercially available product is METABLEN® IR 441 from Mitsubishi Rayon.

Impact Modifier

The polymethacrylate matrix preferably comprises from 1 to 30% by weight, preferably from 2 to 20% by weight, particularly preferably from 3 to 15% by weight, in particular from 5 to 12% by weight, of an impact modifier. These impact modifiers contain an elastomer phase which is composed of crosslinked polymer particles. The impact modifier is obtained in a manner known per se via bead polymerization or via emulsion polymerization.

The simplest case is that of crosslinked particles obtainable by means of bead polymerization with an average particle size in the range from 50 to 500 μm, preferably from 80 to 120 μm. These are generally composed of at least 40% by weight, preferably from 50 to 70% by weight, of methyl methacrylate, from 20 to 40% by weight, preferably from 25 to 35% by weight, of butyl acrylate, and also from 0.1 to 2% by weight, preferably from 0.5 to 1% by weight, of a crosslinking monomer, e.g. a polyfunctional (meth)acrylate, e.g. allyl methacrylate, and, where appropriate, other monomers, e.g. from 0 to 10% by weight, preferably from 0.5 to 5% by weight, of $C_1$-$C_4$-alkyl (meth)acrylates, such as ethyl acrylate or butyl acrylate, preferably methyl acrylate, or of other monomers capable of vinylic polymerization, e.g. styrene.

Preferred impact modifiers are polymer particles which have a core-shell structure comprising two, or particularly preferably three, layers, and which can be obtained via emulsion polymerization (see, for example, EP-A 0 113 924, EP-A 0 522 351, EP-A 0 465 049 and EP-A 0 683 028). Typical particle sizes (diameters) of these emulsion polymers are in the range from 100 to 500 nm, preferably from 200 to 400 nm.

The following method may be used to produce a three-layer or three-phase structure with a core and two shells. An innermost (hard) shell may, by way of example, be in essence composed of methyl methacrylate, very small proportions of comonomers, e.g. ethyl acrylate, and a proportion of crosslinking agent, e.g. allyl methacrylate. The middle (soft) shell may have a structure composed, by way of example, of butyl acrylate and, where appropriate, styrene, while the outermost (hard) shell is in essence mostly the same as the matrix polymer, thus giving compatibility and good bonding to the matrix. The polybutyl acrylate fraction in the impact modifier is decisive for the impact resistance and is preferably in the range from 20 to 40% by weight, particularly preferably in the range from 25 to 35% by weight.

Component c)

Component c) is an optional component which may be present alone or together with component d).

Component c) in the monomer composition may be identical with component a). Preparation may be substantially similar, except that the polymerization parameters are selected so as to give relatively high-molecular-weight polymers. By way of example, this may be achieved via reduction in the amount of molecular weight regulator used.

Component c) is a relatively high-molecular-weight (meth)acrylate (co)polymer, characterized by a solution viscosity in chloroform at 25° C. (ISO 1628—Part 6) greater than or equal to 65 ml/g, preferably from 68 to 75 ml/g.

This can correspond to a molar mass $M_w$ (weight-average) of 160 000 g/mol ($M_w$ being determined by means of gel permeation chromatography with reference to polymethyl methacrylate as calibration standard). By way of example, the molar mass $M_w$ may be determined by gel permeation chromatography or by a light scattering method (see, for example, B. H. F. Mark et al., Encyclopedia of Polymer Science and Engineering, 2nd Edition, Vol. 10, pp. 1 et seq., J. Wiley, 1989).

Component c) in the monomer composition may be identical with component a). Component c) is preferably a copolymer of methyl methacrylate, styrene and maleic anhydride.

By way of example, suitable constituent proportions can be:

from 50 to 90% by weight, preferably from 70 to 80% by weight, of methyl methacrylate, from 10 to 20% by weight, preferably from 12 to 18% by weight, of styrene and from 5 to 15% by weight, preferably from 8 to 12% by weight, of maleic anhydride.

Component d)

Component d) is an optional component which may be used alone or together with component c).

Component d) is a further (meth)acrylate (co)polymer other than a), characterized by a solution viscosity in chloroform at 25° C. (ISO 1628—Part 6) of from 50 to 55 ml/g, preferably from 52 to 54 ml/g.

This can correspond to a molar mass $M_w$ (weight-average) of from 80 000 to 200 000 (g/mol), preferably from 100 000 to 150 000 (g/mol). By way of example, the molar mass $M_w$ may be determined by gel permeation chromatography or by a light scattering method (see, for example, B. H. F. Mark et al., Encyclopedia of Polymer Science and Engineering, 2nd Edition, Vol. 10, pp. 1 et seq., J. Wiley, 1989).

Component d) is a homopolymer or copolymer of at least 80% by weight of methyl methacrylate and, where appropriate, up to 20% by weight of other monomers copolymerizable with methyl methacrylate.

Component d) is composed of from 80 to 100% by weight, preferably from 90 to 99.5% by weight, of free-radical-polymerized methyl methacrylate units and, where appropriate, from 0 to 20% by weight, preferably from 0.5 to 10% by weight, of other comonomers capable of free-radical polymerization, e.g. C1-C4-alkyl (meth)acrylates, in particular methyl acrylate, ethyl acrylate or butyl acrylate. The average molar mass $M_w$ of the matrix is preferably in the range from 90 000 to 200 000 g/mol, in particular from 100 000 to 150 000 g/mol.

Component d) is preferably a copolymer of from 95 to 99.5% by weight of methyl methacrylate and from 0.5 to 5% by weight, preferably from 1 to 4% by weight, of methyl acrylate.

Component d) may have a Vicat softening point VSP (ISO 306-B50) of at least 107° C., preferably from 108 to 114° C. The melt index MVR (ISO 1133, 230° C./3.8 kg) may, by way of example, be in the range greater than or equal to 2.5 cm$^3$/10 min.

Conventional Additives, Auxiliaries and/or Fillers

In a manner known per se, the polymer mixture may also comprise conventional additives, auxiliaries and/or fillers, e.g. heat stabilizers, UV stabilizers, UV absorbers, antioxidants.

For the injection moulding process, lubricants or mould-release agents are of particular importance, and can inhibit or eliminate any possible adhesion of the polymer mixture to the injection mould.

By way of example, lubricants present as auxiliaries may be selected from the group of the saturated fatty acids having fewer than 20, preferably from 16 to 18, carbon atoms, or that of the saturated fatty alcohols having fewer than 20, preferably from 16 to 18, carbon atoms. Preference is given to very small constituent proportions of at most 0.25% by weight, e.g. from 0.05 to 0.2% by weight, based on the polymer mixture.

Examples of suitable materials are stearic acid, palmitic acid, industrial mixtures of stearic and palmitic acid. Examples of other suitable materials are n-hexadecanol, n-octadecanol, and also industrial mixtures of n-hexadecanol and n-octadecanol.

One particularly preferred lubricant or mould-release agent is stearyl alcohol.

Injection Mouldings

Injection mouldings may be produced in a manner known per se by the injection moulding process from the inventive polymer mixture.

Uses

The polymer mixture may be used for producing injection mouldings which have the following properties:
 I. a tensile modulus (ISO 527) of at least 2600 MPa, preferably at least 2750 MPa, particularly preferably at least 2850 MPa,
 II. a Vicat softening point VSP (ISO 306-B50) of at least 109° C., preferably at least 110° C., in particular at least 112° C., e.g. from 110 to
 III. an impact strength (ISO 179-2D, flatwise) of at least 17 kJ/m$^2$, preferably 18 kJ/m$^2$, and
 IV. a melt index MVR (ISO 1133, 230° C./3.8 kg) of at least 1.5 cm$^3$/10 min, preferably 1.65 cm$^3$/10 min.

The injection mouldings may be used as parts of household devices, of communication devices, of devices for hobbies or for sports, or bodywork parts or parts of bodywork parts in the construction of automobiles, of ships or of aircraft. Typical examples of bodywork parts or parts of bodywork parts of automobiles are spoilers, panelling, roof modules or exterior mirror housings.

ADVANTAGEOUS EFFECTS OF THE INVENTION

The inventive polymer mixtures or inventive moulding compositions can be used to produce mouldings, in particular injection-moulded parts, which comply with stringent materials requirements such as those for exterior automotive parts. Four particularly important requirements have successfully been complied with successfully and simultaneously here: tensile modulus, Vicat softening point, impact resistance, and melt index, the orders of magnitude being appropriate for processing and use. In particular, the good flowability gives the required injection-moulding processability, even for parts of sophisticated shape. Surprisingly, the injection moulded parts obtainable here have adequate toughness together with high weather resistance and high heat resistance. In addition, a number of other desirable properties are also achieved in a highly satisfactory manner, e.g. chemicals resistance, yellowness index and intrinsic colour. The property profile can be adjusted individually to the requirements of a particular case by way of the mixing ratio of components a) to d).

EXAMPLES

Preparation of Component a)

A monomer mixture of 6355 g of methyl methacrylate, 1271 g of styrene and 847 g of maleic anhydride is treated with 1.9 g of tert-butyl perneodecanoate and 0.85 g of tert-butyl 3,5,5-trimethylperoxyhexanoate as polymerization initiator and 19.6 g of 2-mercaptoethanol as molecular weight regulator and also with 4.3 g of palmitic acid.

The resultant mixture is charged to a polymerization cell and devolatilized for 10 minutes. It is then polymerized in a water bath for 6 hours at 60° C., and then for 30 hours at 55° C. water bath temperature. After about 30 hours the polymerization mixture reaches its maximum temperature of 126° C. Once the polymerization cell has been removed from the water bath, the polymer is heat-conditioned in the polymerization cell for a further 7 hours at 117° C. in a hot-air cabinet.

The resultant copolymer is clear and almost colourless, and has a VN (solution viscosity number to ISO 1628-6, 25° C., chloroform) of 48.7 ml/g. The flowability of the copolymer was determined to ISO 1133 at 230° C. with 3.8 kg as MVR=3.27 cm$^3$/10 min.

Component a) is the copolymer described above of 75% by weight of methyl methacrylate, 15% by weight of styrene and 10% by weight of maleic anhydride.

The component b) used comprised: a commercially available impact modifier METABLEN® IR 441 from Mitsubishi Rayon.

The component c) used comprised: a commercially available copolymer of 75% by weight of methyl methacrylate, 15% by weight of styrene and 10% by weight of maleic anhydride with a solution viscosity number to ISO 1628-6, 25° C., chloroform of 68 ml/g.

The component d) used comprised: a commercially available copolymer of 99% by weight of methyl methacrylate and 1% by weight of methyl acrylate with a solution viscosity in chloroform at 25° C. (ISO 1628—Part 6) of from about 52 to 54 ml/g.

Inventive Examples 1-3

Example 1

Polymer mixture composed of:
Component a): 50% by weight
Component b): 15.6% by weight
Component c): –
Component d): 34.4% by weight
Lubricant: 0.1% by weight of n-octadecanol (based on the entirety of components a) to d))

Example 2

Polymer mixture composed of:
Component a): 50% by weight
Component b): 13% by weight
Component c): 15% by weight
Component d): 22% by weight Example 3

Polymer mixture composed of:
Component a): 50% by weight
Component b): 13% by weight
Component c): 37% by weight
Component d): –

Comparative Examples (Comp. Ex. 4-9)

Comparative Example 4

Commercially available impact-modified moulding composition with a matrix composed of 99% by weight of methyl methacrylate and 1% by weight of ethyl acrylate, comprising 34% by weight of an impact modifier.

Comparative Example 5

Commercially available moulding composition composed of 96% by weight of methyl methacrylate and 4% by weight of methacrylic acid.

Comparative Example 6

Commercially available moulding composition composed of 99% by weight of methyl methacrylate and 1% by weight of methyl acrylate, $M_w$ about 110 000.

Comparative Example 7

Commercially available impact-modified moulding composition with a matrix composed of 99.5% by weight of methyl methacrylate and 0.5% by weight of n-butyl acrylate, $M_w$ about 125 000 (g/mol), comprising 20% by weight of a three-phase impact modifier.

Comparative Example 8

Commercially available moulding composition composed of 99% by weight of methyl methacrylate and 1% by weight of methyl acrylate, $M_w$ about 110 000 (producer different from that of Comp. Ex. 6).

Comparative Example 9

Commercially available moulding composition composed of 75% by weight of methyl methacrylate, 15% by weight of styrene and 10% by weight of maleic anhydride with a solution visocisty in chloroform at 25° C. (ISO. 1628—Part 6) of 68 ml/g (corresponds to component c) in Examples 1-3).

| Property | Ex. 1 | Ex. 2 | Ex. 3 | Comp. Ex. 4 | Comp. Ex. 5 | Comp. Ex. 6 | Comp. Ex. 7 | Comp. Ex. 8 | Comp. Ex. 9 |
|---|---|---|---|---|---|---|---|---|---|
| Tensile modulus [MPa] | 2900 | 3000 | 3100 | 1700 | 3500 | 3300 | 2500 | 3300 | 3600 |
| VSP [° C.] | 111.5 | 115.8 | 118.5 | 93 | 121 | 107 | 105 | 108 | 119 |
| IS [kJ/m²] | 39 | 28.5 | 20.6 | 70 | 11 | 20 | 53 | 20 | 20 |
| MVR [cm³/10 min] | 3.5 | 2.3 | 1.7 | 0.8 | 2 | 2.8 | 0.9 | 3 | 1.2 |
| TD65/10° [%] | 63 | 58.5 | 52 | 90 | 92 | 92 | 92 | 92 | 90 |
| Yellowness index | 13.09 | 14.46 | 15.87 | n.d. | n.d. | n.d. | n.d. | n.d. | n.d. |
| Chem. resist. isoprop. Outer fibre strain fracture time [s] | | | | | | | | | |
| 0.39% | >1800 | >1800 | >1800 | n.d. | n.d. | n.d. | n.d. | n.d. | n.d. |
| 0.50% | 722 | 1345 | >1800 | n.d. | n.d. | n.d. | n.d. | n.d. | n.d. |
| Chem. resist. EtOH/water Outer fibre strain fracture time [s] | | | | | | | | | |
| 0.39% | >1800 | >1800 | >1800 | n.d. | n.d. | n.d. | n.d. | n.d. | n.d. |
| 0.50% | 210 | 777 | >1800 | n.d. | n.d. | n.d. | n.d. | n.d. | n.d. |
| Taber scratch hardness [μm] | | | | | | | | | |
| 0.7 N | 0 | 0 | 0 | n.d. | n.d. | n.d. | n.d. | n.d. | n.d. |
| 1.5 N | 1.5 | 1.1 | 1.2 | n.d. | n.d. | n.d. | n.d. | n.d. | n.d. |

-continued

| Property | Ex. 1 | Ex. 2 | Ex. 3 | Comp. Ex. 4 | Comp. Ex. 5 | Comp. Ex. 6 | Comp. Ex. 7 | Comp. Ex. 8 | Comp. Ex. 9 |
|---|---|---|---|---|---|---|---|---|---|
| 3.0 N Gloss | 4.2 | 3.5 | 3.9 | n.d. | n.d. | n.d. | n.d. | n.d. | n.d. |
| R(60°) [%] | 43.4 | 49.1 | 45.8 | n.d. | n.d. | n.d. | n.d. | n.d. | n.d. | n.d. = not determined

The invention claimed is:

1. A polymer composition consisting essentially of:
a mixture of the following components:
   a) a low-molecular-weight (meth)acrylate (co)polymer composed of 50 to 90% by weight of methyl methacrylate, from 10 to 20% by weight of styrene, and from 5 to 15% by weight of maleic anhydride having a solution viscosity in chloroform at 25° C. (ISO 1628—Part 6) of 45 to 55 ml/g,
   b) an impact modifier based on crosslinked poly(meth)acrylates,
   c) a relatively high-molecular-weight (meth)acrylate (co)polymer composed of 50 to 90% by weight of methyl methacrylate, from 10 to 20% by weight of styrene, and from 5 to 15% by weight of maleic anhydride having a solution viscosity in chloroform at 25° C. (ISO 1628—Part 6) greater than or equal to 65 ml/g, and/or
   d) a (meth)acrylate (co)polymer other than a) having a solution viscosity in chloroform at 25° C. (ISO 1628—Part 6) of 50 to 55 ml/g,
   where each of the individual components a), b), c) and/or d) may be individual polymers or a mixture of polymers, where the entirety of a), b), c) and/or d) is 100% by weight of the polymer mixture; and
   where a test specimen produced from the polymer mixture simultaneously has the following properties:
   I. a tensile modulus (ISO 527) of at least 2600 MPa,
   II. a Vicat softening point VSP (ISO 306 B50) of at least 109° C.,
   III. an impact strength (ISO 179 2D, flatwise) of at least 17 kJ/m², and
   IV. a melt index MVR (ISO 1133, 230° C./3.8 kg) of at least 1.5 cm³/10 min.

2. The polymer composition according to claim 1, wherein the components are present in the following quantitative proportions, their entirety being 100% by weight:
   a) from 25 to 75% by weight
   b) from 10 to 60% by weight
   c) and/or d) from 10 to 50% by weight.

3. The polymer composition according to claim 1, wherein component b) has a two or three-shell structure.

4. The polymer composition according to claim 1, wherein component d) is a homopolymer or copolymer of at least 80% by weight of methyl methacrylate and, optionally, up to 20% by weight of other monomers copolymerizable with methyl methacrylate.

5. The polymer composition according to claim 4, wherein component d) is a copolymer of from 95 to 99.5% by weight of methyl methacrylate and from 0.5 to 5% by weight of methyl acrylate.

6. An object prepared by injection moulding the polymer composition according to claim 1.

7. A method for producing a molded object, comprising:
   injection moulding the polymer composition of claim 1 into the shape of an object which has the following properties:
   I. a tensile modulus (ISO 527) of at least 2600 MPa,
   II. a Vicat softening point VSP (ISO 306 B50) of at least 109° C.,
   III. an impact strength (ISO 179 2D, flatwise) of at least 17 kJ/m², and
   IV. a melt index MVR (ISO 1133, 230° C./3.8 kg) of at least 1.5 cm³/10 min.

8. A molded part of a household device, a communication device, or a sport of a hobby device or a bodywork component employed in the construction of automobiles, ships or aircraft, comprising:
   a shaped object prepared by injection molding of the polymer composition according to claim 1.

* * * * *

UNITED STATES PATENT AND TRADEMARK OFFICE
CERTIFICATE OF CORRECTION

PATENT NO. : 7,371,795 B2  Page 1 of 1
APPLICATION NO. : 10/575477
DATED : May 13, 2008
INVENTOR(S) : Michael Wicker et al.

It is certified that error appears in the above-identified patent and that said Letters Patent is hereby corrected as shown below:

Column 7, line 67, "112° C., e.g. from 110 to"
   should read -- 112° C., e.g. from 110 to 118° C, --.

Column 8, lines 20-21, "Four particularly important requirements have successfully been"
   should read -- Four particularly important requirements have been --.

Signed and Sealed this

Sixteenth Day of December, 2008

JON W. DUDAS
*Director of the United States Patent and Trademark Office*